United States Patent
Tarricone

(10) Patent No.: US 10,212,237 B2
(45) Date of Patent: *Feb. 19, 2019

(54) SYSTEM AND METHOD FOR MANAGING MEDIA AND SIGNALING IN A COMMUNICATION PLATFORM

(71) Applicant: Twilio, Inc., San Francisco, CA (US)

(72) Inventor: Brian Tarricone, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,054

(22) Filed: Aug. 25, 2017

(65) Prior Publication Data

US 2017/0359422 A1 Dec. 14, 2017

Related U.S. Application Data

(63) Continuation of application No. 14/793,284, filed on Jul. 7, 2015, now Pat. No. 9,774,687.

(Continued)

(51) Int. Cl.
 *H04L 29/06* (2006.01)
 *H04L 29/08* (2006.01)

(52) U.S. Cl.
 CPC ............ *H04L 67/141* (2013.01); *H04L 29/06* (2013.01); *H04L 65/104* (2013.01);
 (Continued)

(58) Field of Classification Search
 CPC .................................................... H04L 29/06
 See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A 3/1971
EP 0282126 A 9/1988
(Continued)

OTHER PUBLICATIONS

"Ethernet to Token ring Bridge"—Black Box Corporation, Oct. 1999 http://blackboxcanada.com/resource/files/productdetails/17044.pdf.

(Continued)

*Primary Examiner* — Shirley X Zhang
(74) *Attorney, Agent, or Firm* — Schwegman Lundberg & Woessner, P.A.

(57) ABSTRACT

Systems and methods for communicating media between a client and a media server. Responsive to a communication initiation received by a signaling controller from a client system, the signaling controller invites a media server by providing an invitation to the media server. The media server is bridged with the client system by controlling a media proxy service to establish a media proxy between the client system and the media server by using client media parameters of the first communication initiation and media server media parameters provided by the media server responsive to the invitation. Media is communicated between the external client system and the media server by using the established media proxy.

20 Claims, 7 Drawing Sheets

Related U.S. Application Data

(60) Provisional application No. 62/021,633, filed on Jul. 7, 2014.

(52) U.S. Cl.
CPC ........ H04L 65/105 (2013.01); H04L 65/1006 (2013.01); H04L 65/1069 (2013.01); H04L 65/4084 (2013.01); H04L 69/24 (2013.01)

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 6/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,885,737 B1 | 4/2005 | Gao et al. |
| 6,874,084 B1 | 5/2005 | Dobner et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |

(56) References Cited

U.S. PATENT DOCUMENTS

| | | |
|---|---|---|
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock |
| 8,861,510 B1 * | 10/2014 | Fritz ............... H04L 12/6418 370/352 |
| 8,879,547 B2 | 11/2014 | Maes |
| 8,903,938 B2 | 12/2014 | Vermeulen et al. |

(56) References Cited

U.S. PATENT DOCUMENTS

| | | |
|---|---|---|
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,774,687 B2 | 9/2017 | Tarricone |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168126 A1* | 7/2006 | Costa-Requena ............... H04L 12/2803 709/219 |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |

(56) References Cited

U.S. PATENT DOCUMENTS

| | | |
|---|---|---|
| 2006/0222166 A1 | 10/2006 | Ramakrishna et al. |
| 2006/0235715 A1 | 10/2006 | Abrams |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Holimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen |
| 2008/0316931 A1 | 12/2008 | Qiu et al. |
| 2008/0317222 A1 | 12/2008 | Griggs et al. |
| 2008/0317232 A1 | 12/2008 | Cause et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Schwartz |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari |
| 2010/0217982 A1 | 8/2010 | Brown et al. |
| 2010/0232594 A1 | 9/2010 | Lawson |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |

(56) References Cited

U.S. PATENT DOCUMENTS

| | | |
|---|---|---|
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma |
| 2011/0143714 A1 | 6/2011 | Keast |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky |
| 2014/0025503 A1 | 1/2014 | Meyer et al. |
| 2014/0058806 A1 | 2/2014 | Guenette et al. |
| 2014/0064467 A1 | 3/2014 | Lawson |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289303 A1 | 9/2014 | Tarricone et al. |
| 2014/0289391 A1 | 9/2014 | Balaji et al. |
| 2014/0289420 A1 | 9/2014 | Tarricone et al. |
| 2014/0304054 A1 | 10/2014 | Orun et al. |
| 2014/0317640 A1 | 10/2014 | Harm |
| 2014/0355600 A1 | 12/2014 | Lawson |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |

(56) References Cited

U.S. PATENT DOCUMENTS

| | | |
|---|---|---|
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0131651 A1 | 5/2015 | Tarricone et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, II |
| 2016/0006819 A1 | 1/2016 | Tarricone |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis |
| 2016/0239770 A1 | 8/2016 | Batabyal et al. |
| 2017/0093688 A1 | 3/2017 | Tarricone et al. |
| 2017/0339283 A1 | 11/2017 | Chaudhary et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 018489 | 2/2009 |
| WO | 2009124223 A | 10/2009 |
| WO | 2010037064 | 4/2010 |
| WO | 2010040010 A | 4/2010 |
| WO | 2010101935 A | 9/2010 |
| WO | 2011091085 A | 7/2011 |

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23. 2012. pp. 1-6.

Archive Microsoft Office 365 Email | Retain Unified Archiving, 2015, GWAVA, Inc., Montreal, Canada.

Complaint for Patent Infringement, *Telinit Technologies, LLC* v. *Twilio Inc.*, dated Oct. 12, 2012.

Kim et al. "In- service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Twilio Cloud Communications—APIs for Voice, VoIP, and Text Messaging, Twilio.

Wu et al. "Quality Evaluation in Peer-to-Peer IPTV Services" Data Traffic and Monitoring Analysis, LNCS 7754. pp. 302-319. 2013.

"U.S. Appl. No. 14/793,284, Non Final Office Action dated Nov. 25, 2015", 14 pgs.

"U.S. Appl. No. 14/793,284, Response filed Mar. 22, 2016 to Non Final Office Action dated Nov. 25, 2015", 16 pgs.

"U.S. Appl. No. 14/793,284, Examiner Interview Summary dated Mar. 22, 2016", 3 pgs.

"U.S. Appl. No. 14/793,284, Final Office Action dated May 25, 2016", 18 pgs.

"U.S. Appl. No. 14/793,284, Response filed Aug. 16, 2016 to Final Office Action dated May 25, 2016", 14 pgs.

"U.S. Appl. No. 14/793,284, Examiner Interview Summary dated Aug. 4, 2016", 3 pgs.

"U.S. Appl. No. 14/793,284, Non Final Office Action dated Nov. 23, 2016", 8 pgs.

"U.S. Appl. No. 14/793,284, Response filed Feb. 23, 2017 to Non Final Office Action dated Nov. 23, 2016", 7 pgs.

"U.S. Appl. No. 14/793,284, Notice of Allowance dated May 25, 2017", 6 pgs.

"U.S. Appl. No. 14/793,284, Notice of Allowance dated Aug. 3, 2017", 2 pgs.

\* cited by examiner

SYSTEM AND METHOD FOR MANAGING MEDIA AND SIGNALING IN A COMMUNICATION PLATFORM

CROSS-REFERENCE TO RELATED APPLICATIONS

This application is a continuation of U.S. patent application Ser. No. 14/793,284, filed 7 Jul. 2015, which claims the benefit of U.S. Provisional Application Ser. No. 62/021,633, filed on 7 Jul. 2014, both of which are incorporated in their entirety by this reference.

TECHNICAL FIELD

This invention relates generally to the communication platform field, and more specifically to a new and useful system and method for managing media and signaling in a communication platform in the communication platform field.

DESCRIPTION OF THE PREFERRED EMBODIMENTS

Figure 1:
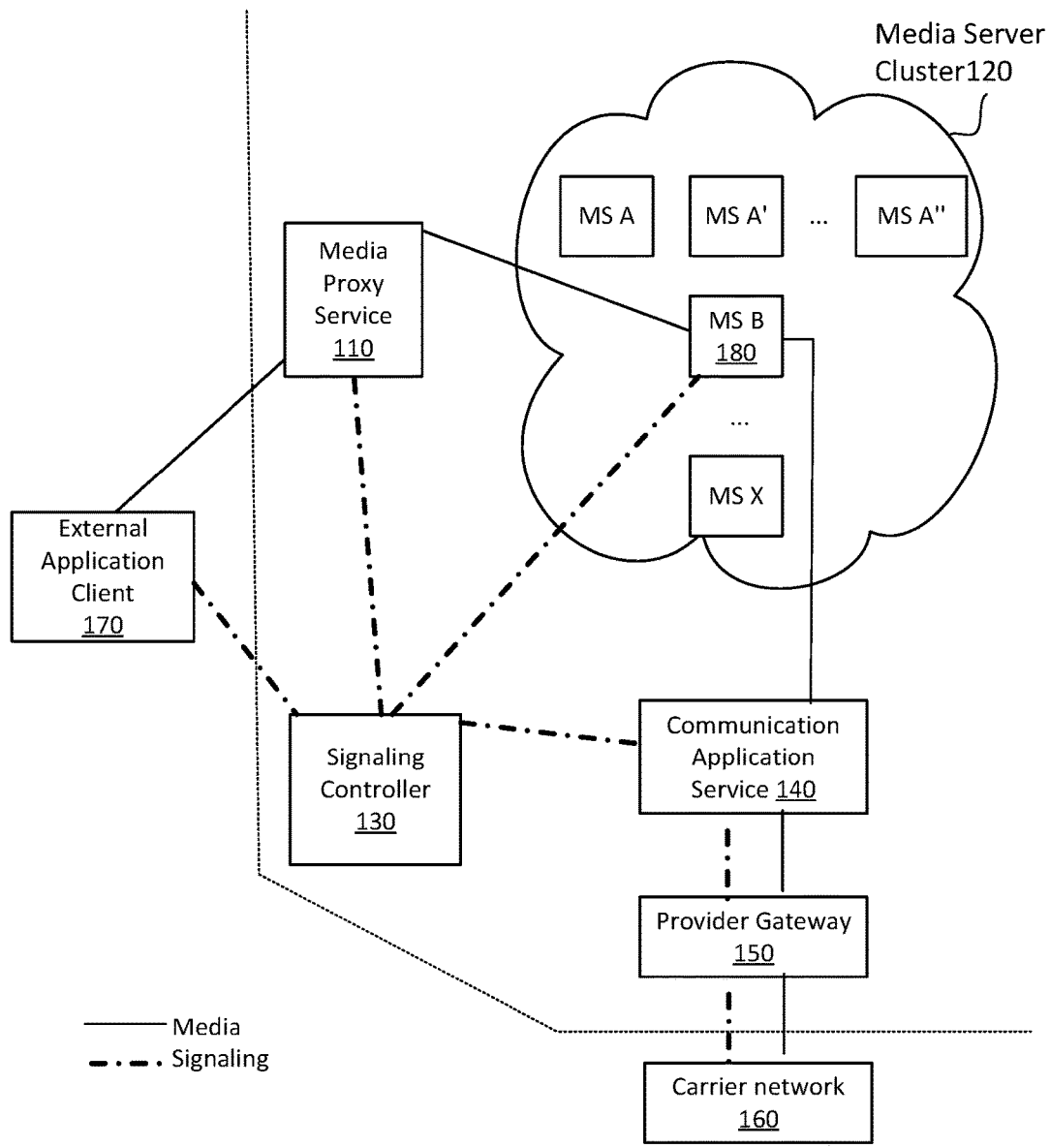
FIG. 1 is schematic diagram of a system of a preferred embodiment.

The following description of preferred embodiments of the invention is not intended to limit the invention to these preferred embodiments, but rather to enable any person skilled in the art to make and use this invention.
1. System for Managing Media and Signaling As shown in FIG. 1, a system for managing media and signaling in a communication platform can include a media proxy service 110, a media server cluster 120, and at least one signaling controller 130. The system functions to separate signaling and media into two services that cooperatively support media communications. The system is a platform architecture that can offer flexibility in media-processing related technology, in scaling capacity of the platform, and improved tolerance to system failure. As opposed to depending on a monolithic signaling and media stack, media and signaling can operate in cooperation but independently. Further the architecture of the media and signaling can provide benefits relating to multi-tenancy, security, per account/per-subaccount metering and billing, scalability, programmatic integration, regionally distributed availability, and/or other suitable benefits.

The system is preferably used within a communication platform. The communication platform can support synchronous voice communication (e.g., IP calls, PSTN calls, conference calls, etc.), synchronous video communication (e.g., video chat, video conferencing, screen sharing, etc.), immersive media experiences (e.g., virtual reality, 3D imagery), and/or other suitable types of communication. The system may additionally be used in combination with application specific logic. In one variation, account directed application logic could be used to direct control logic of a communication session such as in the application communication platform described in U.S. Pat. No. 8,306,021, issued on 6 Nov. 2012, which is incorporated in its entirety by this reference. The system may additionally or alternatively be used in a SIP trunking service or other suitable VoIP communication service such as a system employing the signaling and media functionality of the system of U.S. patent application Ser. No. 14/208,920 filed 13 Mar. 2014, which is incorporated in its entirety by this reference. The system is preferably used in a multi-tenant communication system, where multiple accounts/users share use of common infrastructure. The system may have particular benefits to use in a multi-tenant system as the system can support dynamic scaling, interfacing with outside client infrastructure, and supporting a variety of media service variations, but the system may alternatively be used in a single-tenant communication system. In one preferred use-case, the system can be used to provide more resilient and flexible media services within a communication platform. In another preferred use-case, the system can be used to provide a media service as a platform offering to outside applications and services. A media service as a platform system can allow outside applications or services to utilize media and signaling related infrastructure offered within the platform without having build out custom solutions. The media service as a platform system preferably addresses issues related to offering such a service.

The media proxy service 110 of a preferred embodiment functions as the interface to the media services (e.g., media services of the media server cluster 120). The media proxy service 110 is preferably a proxy to the actual media processing services of the media server cluster 120. Other services and consumers of the media service preferably communicate with the media server cluster through the media server cluster 120. The media proxy service no can be a single component but is preferably a plurality of proxy services that can be used interchangeably. The media proxy service 110 may additionally include a hierarchy of media proxy servers. The media proxy servers can be regionally distributed to serve different geographic regions, and relay media through a base media proxy server (e.g., a main region which contains a media server cluster 120. The base media proxy server can be instantiated in a main regional computing infrastructure location, and may include additional capabilities to interface with central or region specific resources such as canonical database systems.

The media proxy service 110 is preferably hosted in a distributed computing platform but may alternatively be hosted in a central site. The set of proxy servers supporting the media proxy service 110 are preferably referenced through one or more static networking addresses, more preferably a static IP address and/or port. The static address functions to enable client applications to reliably set networking restrictions to allow communication with the media proxy service no. As opposed to a system with a cluster of media servers that constantly is updated, the media proxy service 110 can provide a reliable entry portal of media communication. The machines of the media proxy service 110 can have Enterprise Integration Patterns (EIPs). A client service, which preferably communicates over internet protocol, may whitelist a set of IPs and ports to which a media proxy service 110 will operate over. More preferably, the EIPs can be used by customers to enable whitelisting and/or prioritization of RTP traffic between clients and the system. Additionally, particular entities (e.g., account, sub-accounts, and the like) can be assigned particular sub-sets of networking addresses, which can work in combination with security policy engine. Additional security can further be used in communication such as including of authentication tokens to validate inbound/outbound communication. The clients can be web application systems, native applications for a desktop computer, native applications for mobile computing devices, or any suitable client application instance (e.g., a client application instance of the external application client 170).

The media proxy service 110 preferably facilitates communicating a media stream between a least one client endpoint (e.g., 170 and at least a media server (e.g., 180) of the media service cluster 120. A media stream of a media session may further be routed through multiple media servers (e.g., media servers of the media server cluster 120), a communication application service (e.g., 140 of FIG. 1) (which can control state of a media session), and/or outside communication channels (e.g., external SIP services, PSTN, Over The Top (OTT) communication services, and the like). The media proxy service 110 is preferably a high performance proxy with operational capacity to handle tens of thousands of concurrent media sessions, but any suitable capacity may be used. The media proxy service 110 can be a SIP-based proxy such as OpenSIPS, a STUN/TURN server, or any suitable configured proxy. However, the media proxy service no may use any suitable signaling protocol. The media proxy service no can be configured to provide load balancing across the media server cluster 120. The media proxy service 110 may track the number of media sessions concurrently handled by media servers and, optionally, track the functional capabilities of the types of available media service. The media proxy service no may be configured to route newly routed media sessions to a media server node in the media server cluster 120 according to capacity and capabilities of the media server cluster 120. In alternative embodiments the media proxy service 110 can be an optional element.

The media server cluster 120 of a preferred embodiment functions to provide the media processing services. The media server cluster 120 is preferably a set of media servers (e.g., 180) that run on machines, virtual machines, containers, or other computing environments inside a distributed computing infrastructure. The media server cluster 120 may alternatively be hosted in any suitable manner. In one variation, there is one media server cluster 120 for the entire system. In another variation, there are multiple media server clusters 120 where each media server cluster 120 is located in a different geographically distinct region.

The media servers (e.g., 180) of the media server cluster 120 function to operate on the media stream—analyzing/processing the stream and/or augmenting the stream. In one preferred implementation, the media server cluster 120 includes a plurality of media servers that provide media transcoding services. Immutable media servers preferably inspect, analyze, log, and/or process media streams. A recording media service may be an example of an immutable media server. A mutable media server preferably alters, manipulates, and/or augments the communicated stream. The transcoding media can convert between media formats. As an example, a transcoding media server may convert between various codecs such as Speex used in mobile operating system applications (e.g., iOS and Android), Opus used in web and WebRTC applications, and PCMU used in PSTN and other media services. Any suitable codec or media transformation may alternatively be performed. The media server can additionally translate between media mediums such as converting a pure audio stream to a video stream or pulling the audio from a video into an audio stream. Other suitable media server services can include mixing, recording, translating, audio or video processing, answering machine detection, Text to Speech services, Interactive voice response services, DTMF detection, and/or any suitable media services.

The media servers (e.g., 180) can additionally include metering and logging layers that operate in coordination with the provided media services. The metering and logging function to create a record of notable activities. The metering can be used in providing programmatic hooks (e.g., callback URI triggering, application execution, and the like), billing/crediting an associated entity (e.g., charging for services or controlling resource access), creation of an audit trail, and/or other suitable functionality.

A media service API can be provided. The media service API can be a REST API. The API is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein HTTP may be used, but should be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. The media service API can be used to provide information about current state of media sessions, events, media, or related data. The media service API can additionally provide interactive control of one or more operation of a media service.

The media server cluster 120 can be a substantially homogeneous cluster of identical or similar instances of the same media server. For example, a system may provide only one media focused process in which case all the media servers may be substantially similar. The media server cluster 120 may alternatively be heterogeneous containing more than one type of service provided by the media servers. In one example, there may be a first type of transcoding server operating on a first software (such as the FreeSWITCH) stack inside of the operating system of a virtual machine, and then a second type of transcoding server built to run in the virtual machine. In this example, the first type of media server may be a legacy media service, and the second type may be a new version of the media service. The use of the first and second type may be interchangeable. Alternatively, two of the media servers may not be interchangeable where each is designed for a particular purpose. For example, a subset of media servers may be for audio processing and a second subset of media servers for video processing operations. The media proxy service 110 can preferably dynamically route media streams appropriately.

A signaling controller 130 functions as a distinct service that manages signaling of a media stream. The signaling controller 130 preferably handles the signaling messaging that directs media streams. The signaling controller 130 preferably maintains state of the Session Description Protocol (SDP) mechanism of a communication session. A communication session preferably includes the media session and the directing signaling messages. The signaling controller 130 can preferably communicate SDP information to relevant resources such as an outside client initiating or receiving a communication, or to an internal resource such as a communication application service (e.g., 140).

The signaling controller 130 is preferably a service on a computing device distinct from that of the media resources (e.g., the media proxy service 110 and the media server cluster 120). The signaling controller 130 may be on a different host or optionally a different virtual machine. Operating independently, a communication session can be recovered during a failure of a media or signaling resource. In particular, if a host of a media resource, either a media proxy server or a media server, goes down, the associated signaling controller 130 for that communication session can re-establish the media session with a different media resource. Additionally, as distinct elements, the signaling controller 130 can perform asynchronous operations relating to a communication session. For example, a signaling controller 130 may asynchronously call out to an authentication service, and later act on an authentication response from the authentication service.

The signaling controller 130 can additionally include a set of orchestration services and state managers that function to manage the orchestration, allocation, and state of related services. The configuration of orchestration services and/or states managers may be different depending on the type and function of the provided media services. The orchestration service preferably includes application logic to interface and direct one or more media service state managers. The communication signaling is preferably managed within the signaling controller 130 (i.e., orchestration service). For example, incoming SIP communication is directed to the signaling controller 130, the orchestration service 130 then communicates with a media service state manager that sets up media service infrastructure to support the communication, the media service state manager then transmits the information back to the orchestration service which then negotiates the communication session as specified by the media service state manager. A media state manager can include application logic and state information to determine the state of a particular type of media communication session such as a conferencing media session, a transcoding media session, and the like. A media state manager may additionally include application logic to control the state of related media servers. There can be multiple types or media state managers, which apply different levels of media service modeling.

The system can additionally include a communication application service (e.g., 140), which functions to supply control logic to the communication session. The communication application service can be a combined media and signaling element, but may alternatively be split media and signaling system.

The system can additionally or alternatively include communication interfaces, which function to bridge media and/or signaling to outside communication channels such as the PSTN, SIP services, OTT media communication services, and/or any suitable communication channel.

The system may additionally include other components that function to support a media service as a platform offering. For example the system can include a queuing system to rate limit, prioritize, order, and manage shared usage of media servers and other resource. The system can additionally include a policy engine that functions to regulate apply policy to system activities of account, sub-account, ephemeral users, and/or other entities. The system can include an identity system that functions to create an authentication model and identity ecosystem within different system scopes (e.g., identity within an account or identity across multiple accounts). The presence system can additionally be included. In one variation, the functionality of the presence system is offered in a combined identity-presence system. A presence system can function to provide information about availability, device destination, and communication preferences. A routing service can be used to dynamically determine and select routes within the system. The system may additionally or alternatively include any suitable support sub-system.

The media service cluster 120 can include a variety of different specialized media services. Those media services may be combined into a monolithic media service, but the media services are preferably divided between more targeted media services such as transcoding services, recording services, text-to-speech services, speech recognition services, input detection services, conferencing services, and other suitable media services.

A transcoding service functions to convert between formats. The transcoding may convert an active media stream to another format. For example, a call with two endpoints may natively use two different codecs. The transcoding service may convert one or two of the legs of the communication to a common or compatible media stream format. Additionally, the transcoding service may work to convert accessed media resources that are or will be used in a communication session. For example, an MP3 file accessed from a URI may be converted to a wave file for playback during a phone call. In another example, a web client may use an OPUS codec while a mobile app may use Speex codec. The transcoding service preferably accepts a media stream in a first format and outputs a media stream in a second format.

A recording service preferably enables recording of calls or communication sessions. Recording is preferably for audio recording, but may additionally or alternatively include video recording, screen-sharing recording, multimedia recording, or any suitable recording service. The recording service may have additional features that may or may not be integrated into the recording service of the local service. Transcription is one preferred feature of the recording service. Transcription may use algorithmic speech recognition techniques, automated manual transcription, semi-automated techniques, and/or any suitable approach.

A Text-to speech service preferably generates, plays, and/or converts text into audible speech. The audible speech is then played within a communication stream. For example, a phone call may connect to a telephony application that specifies a script that should be read to the caller. The script is preferably directed to the TTS service to be played during the phone call. The text-to-speech services are preferably for audio communication. However, a computer generated video simulation or rendering of a speaker may additionally be created for video communication. The text-to-speech service preferably takes text as an input and outputs an audio stream that can be played or mixed in with the communication session A speech recognition service is preferably a service used in collecting spoken input and converting it into a format for transcription, natural language processing, or interpretation of responses. The speech recognition may use the transcription component described above, but may alternatively use an alternative approach. The input to the speech recognition is preferably an audio stream and parameters of speech recognition.

An input detection service functions to gather inputs of a communication device. Preferably the input detection service collects DTMF inputs from a user. In the DTMF input detection variation, an audio stream and parameters of detection are preferably an input to the service. The components of an answering machine detection service may alternatively be integrated into the input detection service or any suitable service.

Conferencing services preferably facilitate calls with more than two endpoints connected. Various features of conference calls may be enabled through components of conferencing services. The conferencing service preferably mixes audio for audio and/or video sessions.

2. Method for Managing Media and Signaling

Figure 2:
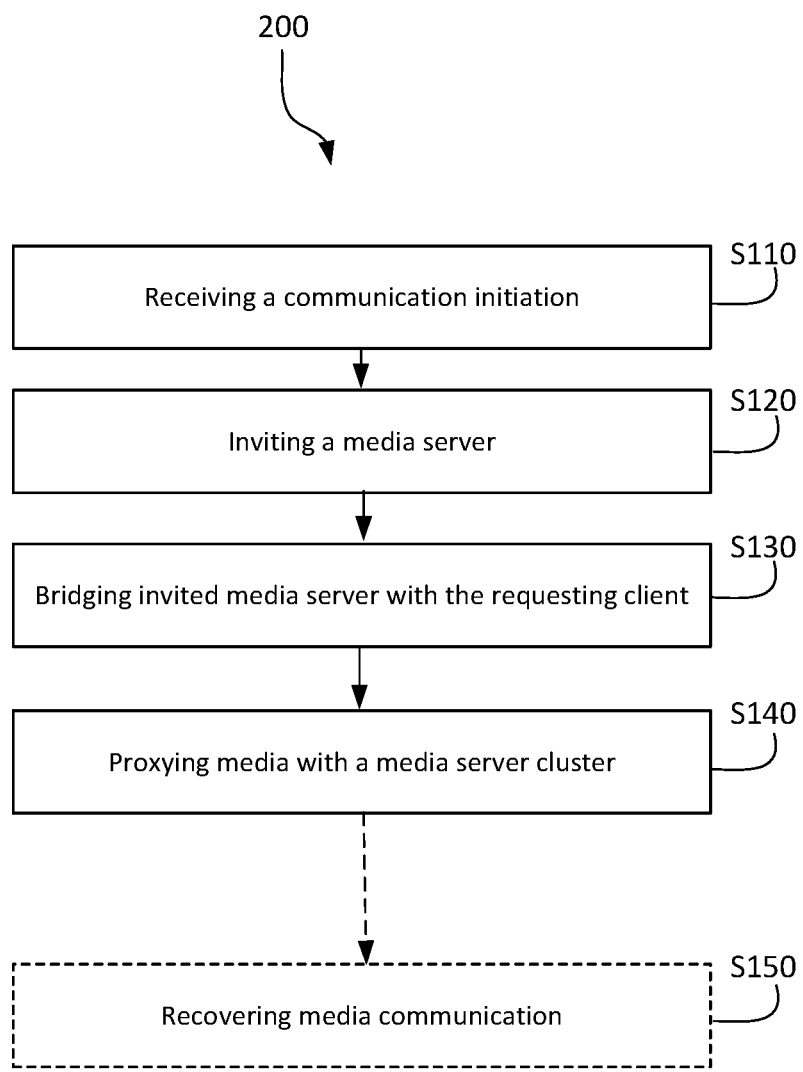
FIG. 2 is a process block diagram of a method of a preferred embodiment.

As shown in FIG. 2, a method (e.g., 200) for managing media and signaling in a communication platform can include receiving a communication initiation S110, inviting a media server (e.g., the media server 180 of FIG. 1) S120, bridging the invited media server with the requesting client (e.g., the client 170 of FIG. 1) S130, and proxying media with a media server cluster (e.g., the media server 180 of the media server cluster 120) S140. The method functions to establish a media stream through media resources that are separate from the signaling resources. Additionally, the method can be applied to enable: scaling media resources independent from signaling resources; recovering a communication stream when a media resource fails; and providing a variety of media services.

Block Silo, which includes receiving a communication initiation, functions to receive an invite from a client service (e.g., 170). Preferably, a signaling and media communication protocol is used in interfacing with external client devices such as communication endpoints, applications, or other external communication systems. More preferably, the protocol substantially conforms to the session initiation protocol (SIP), but any suitable protocol may be used. Alternatively, other communication approaches such as WebRTC, which may have a control channel and a media, real-time communication channel may alternatively or additionally be supported. Herein, SIP is used as the exemplary protocol, but it would be appreciated by one skilled in the art that alternative protocol communication may be used. The communication initiation preferably occurs as a result of an INVITE. In response, '100' Trying response can be returned. The INVITE is preferably received from an external client (e.g., 170), and is received at a signaling controller (e.g., 130). As described above, the signaling controller (e.g., 130) preferably manages the control directives that orchestrate the communication (e.g., the non media communication). The external client (e.g., 170) is preferably a system operated by an account holder of the platform.

The communication initiation preferably initiates a set of asynchronous events within a signaling controller (e.g., 130). The asynchronous events can be passed off to any suitable number of handlers. The handler services can determine how the communication initiation is handled. In one variation, pluggable authentication services can be integrated into the communication process during the asynchronous events. The type of authentication can depend on particular situations such as the type of communication, the type of client device, and other suitable conditions.

Block S120, which includes inviting media server (e.g., 180), functions to dispatch the communication initiation to media related systems. Dispatchers can be services that distribute a communication initiation to a media service. A session description protocol (SDP) message or any suitable communication descriptor is transparently passed to the media services. The media services (e.g., the media proxy service 110, the media server 180) are preferably distinct from the signaling controller (e.g., 130). A smart media control function may sit in front of a media server cluster (e.g., 120). The media control function can provide basic traffic forwarding to media services, but may additionally provide smart load balancing. The capacity of media servers can be monitored and traffic routed to different media instances according to the capacity.

Block S130, which includes bridging invited media server (e.g., 180) with a requesting client (e.g., 170), functions to connect the media communication of the client with that of the media server. Preferably, the media server system (e.g., 180) will issue an INVITE back to the signaling controller (e.g., 130). The INVITE from the media server is preferably correlated with the initial INVITE sent to the media server. In response, the session description information (e.g., the SDP received from the media server), is used to INVITE the media proxy (e.g., the media proxy service no) and establish a back-to-back user agent from the original INVITE from the client—control signaling is executed to establish the media proxy (e.g., no) in the media communication flow between the client (e.g., 170) and the media server cluster (e.g., 120). The media proxy (e.g., 110) preferably exists as an edge node of the communication platform. The media proxy will preferably have standard EIPs such that a client can whitelist and/or prioritize real time protocol traffic between the client and the media proxy. With a standardized IP address of the media proxy, a client system (e.g., 170) can rely on a consistent set of components with which they will interface.

Block S140, which includes proxying media with the media server cluster (e.g., the media server 180 of the cluster 120), functions to communicate media between the client and the media server cluster. Preferably a media proxy (e.g., no) is established as an intermediary component between the client and at least the used media services in the media server cluster. The media proxy can preferably support numerous concurrent media channels. As one example, tens of thousands of media sessions can be proxied by a proxying media server. The media proxy servers can additionally be scaled to support more concurrent media sessions. The media proxy could be a SIP-based proxy but may alternatively be a TURN server, or any suitable proxying system.

During, the communication, the signaling controller (e.g., 130) can preferably augment and modify the media services. Media services may receive new instructions; media services can be added to the media route; media services can be removed from the media route; and other suitable actions can be directed from the signaling controller. If the media requirements change, then the signaling controller Additionally the method can include recovering from a media service failure. The signaling controller or any suitable signaling resource can preferably re-establish media communication in the event of a media communication failure. For example, if a media server in the cluster fails, the signaling controller can re-negotiate a new media channel.

Similarly, the method may include recovering from a signaling service failure. In some cases signaling may involve multiple components, which can provide some redundancy in the state of the communication session. Since the media channel is distinct from the signaling channel, if a signaling component fails, the system can re-establish new signaling resources while maintaining the media channel. This may involve augmenting the media resources as well.

In one preferred variation, the signaling and media communication is used to support a communication application session. The method can be used to establish a media channel that substantially flows from the client device (e.g., 170), to a media proxy server (e.g., 110), to the used media server instances (e.g., 180) and then to a communication application service (e.g., 140) (such as a call router which can process application instructions). The media channel may terminate within the communication platform, such as when a media player service is generating media for a connected endpoint. Alternatively, the media channel may be further connect out to a provider gateway (e.g., 150 of FIG. 1) to some external communication system (e.g., 160 of FIG. 1) such as a PSTN carrier network, a SIP network, an over-the-top communication platform, or any suitable external communication system. A signaling controller (e.g., 130) preferably maintains the signaling channel with some access to the involved media resources and the communication application service.

In one variation, the method and system can be applied to a media service platform. The method is preferably operated to facilitate providing media access and use to outside applications and services as a form of service. Outside entities can delegate media processing tasks, which otherwise may require considerable technical investment for the outside entities to develop and/or maintain. As a media service provider, the system and method can provide transcoding services, conferencing services, DTMF tone interpretations, scaling of picture in a video stream, or any suitable media service. The media services can originate through one service and be terminated in any suitable destination endpoint, but the media streams may alternatively originate and terminate in the same external service.

Additionally, the system and method can provide a dynamic architecture that can be scaled to meet demand and can be distributed across geographically distinct regions.

3. Communication Platform System and Media System

Figure 3:
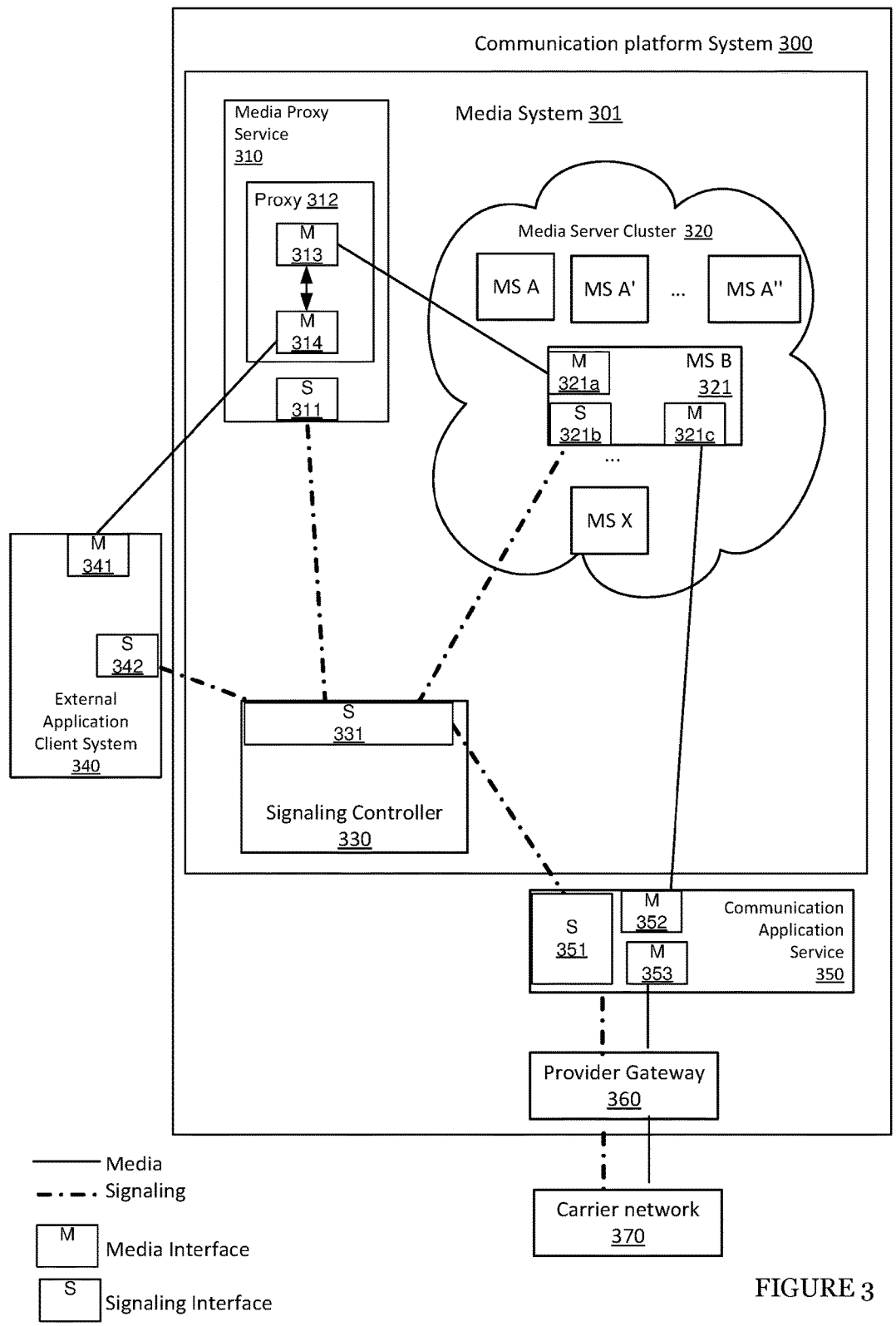
FIG. 3 is schematic diagram of a system of a preferred embodiment.

As shown in FIG. 3, a communication platform system 300, in accordance with an embodiment, includes a media system 301, a communication application service 350 and a provider gateway 360.

In some implementations, the communication application service 350 is similar to the communication application service 140 of FIG. 1. In some implementations, the provider gateway 360 is similar to the provider gateway 150 of FIG. 1. In some implementations, the carrier network 370 is similar to the carrier network 160 of FIG. 1. In some implementations, the external application client system 340 is similar to the external application client system 170 of FIG. 1.

The media system 301 includes a media proxy service 310, a media server cluster 320, and a signaling controller 330. In some implementations, the media proxy service 310 includes at least one media proxy (e.g., the media proxy 312).

In some implementations, the media proxy (e.g., 312) includes a back-to-back user agent. In some implementations, the media proxy service 310 includes at least one of a SIP-based proxy, and a STUN(Session Traversal Utilities for NAT (Network Address Translator))/TURN (Traversal Using Relays around NAT) server. In some implementations, the SIP-based proxy includes an OpenSIPS proxy.

In some implementations, the media server cluster 320 includes at least one media server (e.g., the media server 321).

In some implementations, the media proxy service 310 is similar to the media proxy service 110 of FIG. 1. In some implementations, the media server cluster 320 is similar to the media server cluster 120 of FIG. 1. In some implementations, the signaling controller 330 is similar to the signaling controller 130 of FIG. 1.

In some implementations, the provider gateway 360 is communicatively coupled to a carrier network 370 and the communication application service 350. In some implementations, the media system 301 is communicatively coupled to an external application client system 340 and the communication application service 350. In some implementations, the media system is external to the communication platform system 300. In some implementations, the media system is external to the communication platform system 300, and the media system is communicatively coupled to an external application client system (e.g., 340).

3.1 Signaling Interfaces and Media Interfaces

In some implementations, the external application client system 340 includes a media interface 341 and a signaling interface 342. In some implementations, the signaling controller includes a signaling interface 331. In some implementations, the media server 321 includes the media interface 321a, and a signaling interface 321b. In some implementations, the media server 321 includes media interfaces 321a and 321c, and a signaling interface 321b. In some implementations, the media proxy service includes a signaling interface 311. In some implementations, the media proxy 312 includes a client proxy media interface 314 and a media server proxy media interface 313. In some implementations, the communication application service 350 includes a signaling interface 351 and a media interface 352. In some implementations, the communication application service 350 includes a signaling interface 351 and the media interfaces 352 and 353.

In some implementations, each media interface (e.g., 313, 314, 321a, 321c, 341, 352, and 354), corresponds to at least one of a media communication IP address, a media communication port, a media communication protocol, and a media processing codec. In some implementations, the media communication protocol is RTP (Real-time Transport Protocol). In some implementations, each signaling interface (e.g., 311, 321b, 331, 342, and 351), corresponds to at least one of a signaling IP address, a signaling communication port, and a signaling protocol.

3.2 Communication of Signaling Messages

In some implementations, the client system 340 and the signaling controller 330 communicate signaling messages by using the signaling interface 342 and the signaling interface 331, respectively. In some implementations, the client system 340 provides the signaling controller 330 with at least a first communication initiation from the signaling interface 342 (of the client system) to the signaling interface 331 (of the signaling controller).

In some implementations, the signaling controller 330 and the media server 321 communicate signaling messages by using the signaling interface 331 and the signaling interface 321b, respectively.

In some implementations, the signaling controller 330 and the media proxy service 310 communicate signaling messages by using the signaling interface 331 and the signaling interface 311, respectively.

In some implementations, the signaling controller 330 and the communication application service 350 communicate signaling messages by using the signaling interface 331 and the signaling interface 351, respectively.

In some implementations, the communication application service 350 and the provider gateway 360 communicate signaling messages by using the signaling interface 351 of the communication application service 350.

3.3 Media Communication

In some implementations, the media proxy service no and the media server 321 communicate media by using the media interface 313 and the media interface 321a, respectively.

In some implementations, the media proxy service 110 and the client system 340 communicate media by using the media interface 314 and the media interface 341, respectively.

In some implementations, the media server 321 and the communication application service 350 communicate media by using the media interface 321c and the media interface 352, respectively.

In some implementations, the communication application service 350 and the provider gateway 360 communicate media by using the media interface 354 of the communication application service 350.

In some implementations, media is communicated by using a Real-time Transport Protocol (RTP).

3.4 Computing Devices

In some implementations, the communication platform system 301 is implemented as a single server device. In some implementations, the communication platform system 301 is implemented as a distributed computing system that includes a plurality of server devices, and each server device of the distributed computing system includes one or more of the media system 301, the communication application service 350, and the provider gateway 360.

In some implementations, the media system 301 is implemented as a single server device. In some implementations, the media system 301 is implemented as a distributed computing system that includes a plurality of server devices, and each server device of the distributed computing system includes one or more of the media proxy service 310, the media server cluster 320, and the signaling controller 330.

In some implementations, the media proxy service 310 is implemented as a single server device. In some implementations, the media proxy service 310 is implemented as a distributed computing system that includes a plurality of server devices.

In some implementations, the media server 321 is implemented as a single server device. In some implementations, the media server 321 is implemented as a distributed computing system that includes a plurality of server devices.

In some implementations, the media server cluster 320 is implemented as a single server device. In some implementations, the media server cluster 320 is implemented as a distributed computing system that includes a plurality of server devices.

In some implementations, the signaling controller 330 is implemented as a single server device. In some implementations, the signaling controller 330 is implemented as a distributed computing system that includes a plurality of server devices.

In some implementations, the communication application service 350 is implemented as a single server device. In some implementations, the communication application service 350 is implemented as a distributed computing system that includes a plurality of server devices.

In some implementations, the provider gateway 360 is implemented as a single server device. In some implementations, the provider gateway 360 is implemented as a distributed computing system that includes a plurality of server devices.

4. Method of FIG. 4

Figure 4:
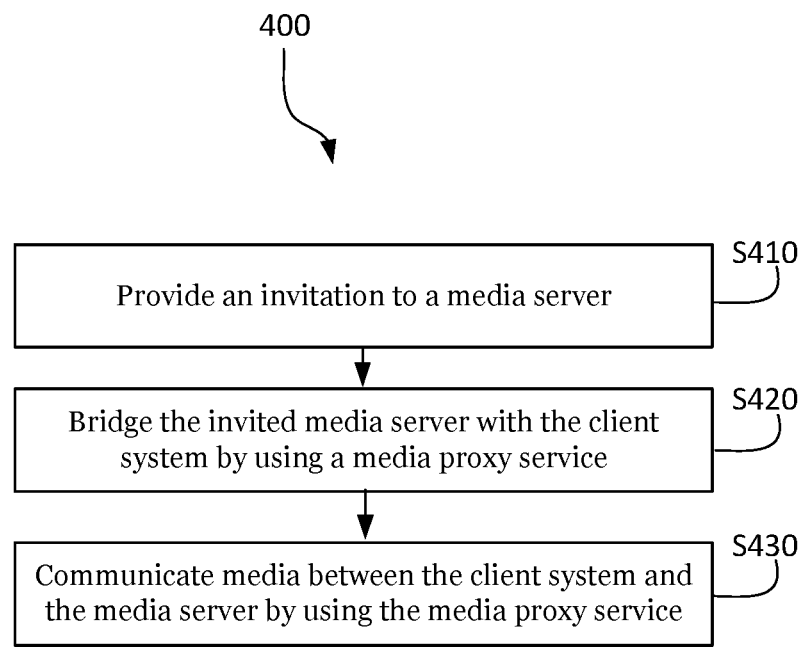
FIG. 4 is a process block diagram of a method of a preferred embodiment.
Figure 5:
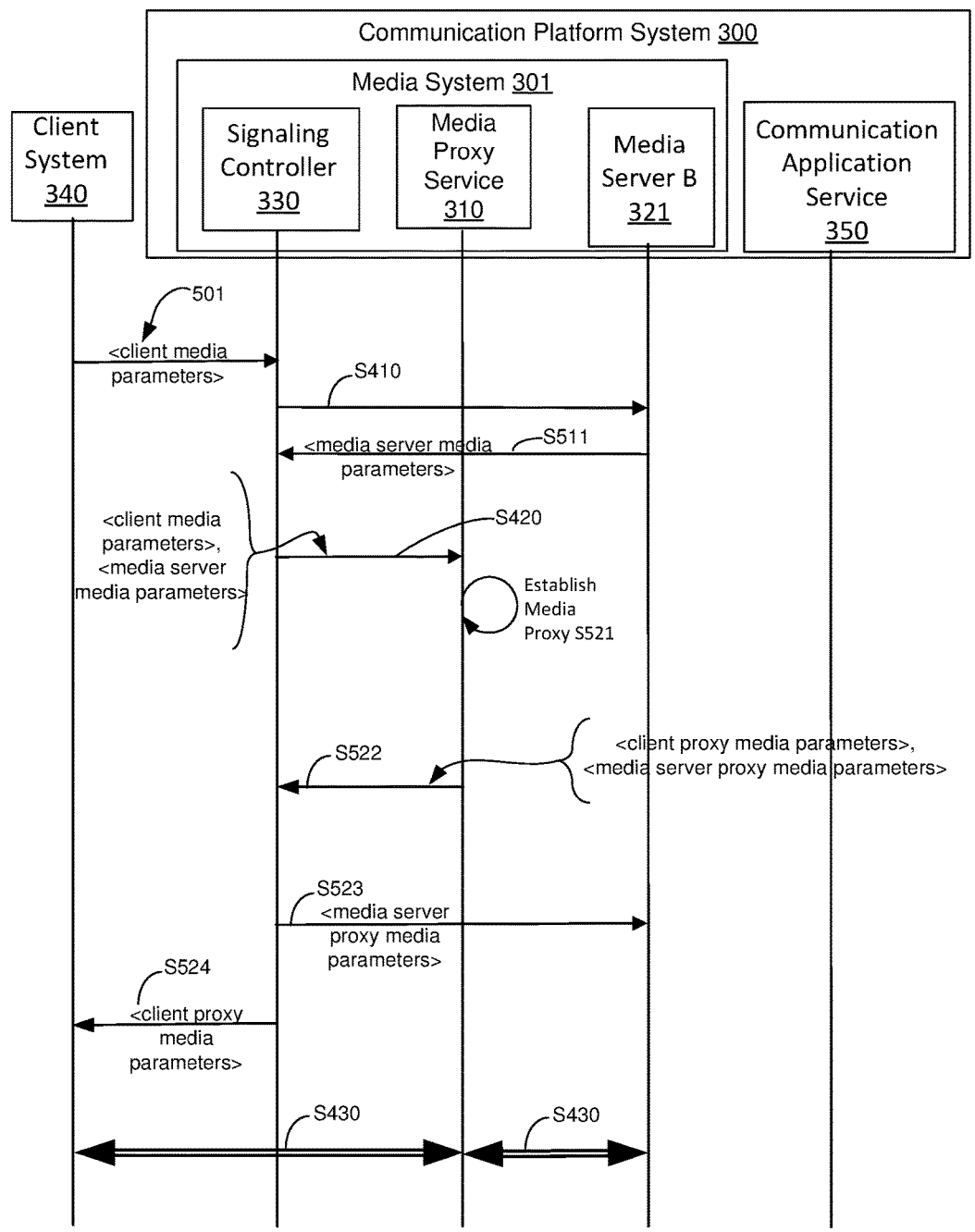
FIG. 5 is a communication sequence diagram of a method of a preferred embodiment.

FIG. 4 is a process block diagram of a method 400 of an embodiment, and FIG. 5 is a communication sequence diagram of an implementation of the method 400. The method 400 of FIGS. 4 and 5 is performed at a communication platform system (e.g., 300 of FIGS. 3 and 6), and responsive to a first communication initiation (e.g., 501 of FIG. 5) received by the signaling controller (e.g., 330 of FIG. 3) of the communication platform system (e.g., 300) from a client system (e.g., 340) external to the communication platform system. In some embodiments, the method 400 is performed at a media system (e.g., 301 of FIGS. 3 and 7).

The method 400 includes: providing an invitation to a media server (e.g., 321 of FIG. 3) of the communication platform system (e.g., 300) based on the first communication initiation (e.g., 501 of FIG. 5), the first communication initiation specifying client media parameters, the invitation being provided by the signaling controller (e.g., 330) (process S410); bridging the invited media server (e.g., 321) with the external client system (e.g., 340) by using a media proxy service (e.g., 310) of the communication platform system (process S420); and communicating media between the external client system (e.g., 340) and the invited media server (e.g., 321) by using the media proxy service (e.g., 310) (process S430).

Process S420, which includes bridging the invited media server with the external client system by using the media proxy service, includes: responsive to a first signaling message provided by the invited media server (e.g., the signaling message of the process S511 of FIG. 5), the signaling controller providing an invitation to the media proxy service (e.g., the signaling message of the process S420 shown in FIG. 5) to establish media communication (processes S521, S522, S523, S524) with the external client system based on the first signaling message, the media server providing the first signaling message (e.g., the signaling message of the process S511) responsive to the invitation (e.g., the signaling message of the process S410 shown in FIG. 5) provided by the signaling controller.

In some implementations, the signaling controller 330 performs the process S410. In some implementations, the signaling controller 330 performs the process S420. In some implementations, the media proxy service 310 performs the process S430. In some implementations, the media server (e.g., 321) performs the process S511. In some implementations, the media proxy service 310 performs the process S521. In some implementations, the media proxy service 310 performs the process S522. In some implementations, the signaling controller 330 performs the process S523. In some implementations, the signaling controller 330 performs the process S524.

In some implementations, the process S410 is similar to the process S120 of FIG. 1. In some implementations, the process S420 is similar to the process S130 of FIG. 1. In some implementations, the process S430 is similar to the process S140 of FIG. 1.

In some implementations, the first communication is received by the signaling controller as described above for Silo of FIG. 2.

In some implementations, the method 400 includes recovering media communication by using the signaling controller. In some implementations, the media communication is recovered as described above for S150 of FIG. 2.

4.1 Providing an Invitation to a Media Server

In some implementations, the process S410 functions to control the signaling controller 330 to invite a media server (e.g., 321) of the media system 301 by providing an invitation to the media server. In some implementations, the invitation is provided based on the first communication initiation (e.g., 501). The first communication initiation specifies client media parameters. In some implementations, the client media parameters identify the client system media interface 341. In some implementations, the client media parameters include at least media communication information of the client system (e.g., 340). In some implementations, media communication information of the client system includes at least one of a media communication IP address of the client system, a media communication port of the client system, a media communication protocol of the client system, and a media processing codec of the client system.

In some implementations, the signaling controller 330 provides the invitation to the media server via a signaling message (e.g., the signaling message of the process S410 shown in FIG. 5). In some implementations, the signaling controller 330 provides the invitation to the media server via a SIP message. In some implementations, the invitation is a SIP INVITE request, and invitation includes the client media parameters as session description protocol (SDP) parameters of the SIP INVITE request.

In some implementations, the first communication initiation (e.g., 501) is a SIP INVITE request. In some implementations, the first communication initiation is a SIP INVITE request, and the client media parameters are session description protocol (SDP) parameters of the SIP INVITE request.

In some implementations, the signaling controller 330 receives the first communication initiation (e.g., 501) via the signaling interface 331 of the signaling controller 330, and the client system (e.g., 340) provides the first communication initiation via a signaling interface (e.g., 342) of the client system.

In some implementations, the signaling controller 330 provides the invitation via the signaling interface 331, and the media server receives the invitation via a signaling interface (e.g., 321b).

In some implementations, providing an invitation to a media server includes selecting at least one of a plurality of media servers. In some implementations, the signaling controller 330 selects a media server of the cluster 320 by using at least one of a media state manager (e.g., the media state manager described above for FIG. 1), a dispatcher (e.g., the dispatcher described above for S120 of FIG. 2), and a smart media control function (e.g., the smart media control function described above for S120 of FIG. 2).

In some implementations, the media server (e.g., 321) is included in the media server cluster 320, and providing an invitation to a media server (e.g., 321) includes controlling the signaling controller 330 to provide the invitation to the media server (e.g., 321) by using a media server cluster controller of the media system 301.

4.2 Bridging the Invited Media Server

In some implementations, the process S420 functions to bridge the invited media server (e.g., 321) with the external client system (e.g., 340) by using the media proxy service 310 of the media system 301.

In some implementations, the signaling controller 330 provides media server media parameters of a signaling message provided by the media server (e.g., the signaling message of the process S511) and the client media parameters of the first communication initiation (e.g., 501) to the media proxy service 310 via at least a second signaling message (e.g., the signaling message of the process S420 shown in FIG. 5). In some implementations, the signaling controller 330 controls the media proxy service 310 to establish a media proxy (e.g., 312) by providing the client media parameters and the media server media parameters to the media proxy service 310 via at least one signaling message (e.g., the signaling message of the process S420 shown in FIG. 5).

In some implementations, the media proxy service 310 establishes media communication with the external client system by using the client media parameters, and establishes media communication with the media server by using the media server media parameters. In some implementations, the first communication initiation (e.g., 501), the invitation (e.g., the signaling message of the process S410 shown in FIG. 5) the first signaling message (e.g., the signaling message of the process S511), and the second signaling message (e.g., the signaling message of the process S420 shown in FIG. 5) are Session Initiation Protocol (SIP) INVITE requests.

In some implementations, the client media parameters are included in the first communication initiation (e.g., 501) as session description protocol (SDP) parameters. In some implementations, the client media parameters are included in the invitation (e.g., the signaling message of the process S410 shown in FIG. 5) as SDP parameters. In some implementations, the media server media parameters are included in the first signaling message (e.g., the signaling message of the process S511) as SDP parameters. In some implementations, the client media parameters and the media server media parameters are included in the second signaling message (e.g., the signaling message of the process S420 shown in FIG. 5) as SDP parameters.

In some implementations, the first signaling message (e.g., the signaling message of the process S511) is a SIP response (e.g., "200 OK"), and the media server media parameters are included in the first signaling message as SDP parameters.

In some implementations, the first signaling message (e.g., the signaling message of process S511) identifies the media proxy service (e.g., 310).

In some implementations, the media server (e.g., 321) provides the first signaling message (e.g., the signaling message of process S511) via the signaling interface 321b, and the signaling controller 330 receives the signaling message via the signaling interface 331.

In some implementations, the signaling controller 330 provides the second signaling message (e.g., the signaling message of the process S420 shown in FIG. 5) via the signaling interface 331, and the media proxy service 310 receives the signaling message via the signaling interface 311.

In some implementations, bridging the invited media server includes controlling the media proxy service 310 of the media system 301 to establish a media proxy (e.g., 312) (process S521) between the client system (e.g., 340) and the media server (e.g., 321) by using the client media parameters of the first communication initiation (e.g., 501) and media server media parameters provided by the media server (e.g., 321) responsive to the invitation (e.g., the media server media parameters provided at the process S511).

In some implementations, the media server media parameters identify the media server media interface (e.g., 321a).

In some implementations, the media server media parameters include at least media communication information of the media server (e.g., 321). In some implementations, media communication information of the media server includes at least one of a media communication IP address of the media server, a media communication port of the media server, a media communication protocol of the media server, and a media processing codec of the media server.

4.2.1 Providing Proxy Parameters to the Client System and the Media Server

In some implementations, establishing a media proxy between the client system and the media server includes: providing client proxy parameters to the client system (e.g., 340) (process 524 of FIG. 5); and providing media server proxy parameters to the media server (e.g., 321) (process 523 of FIG. 5). In some implementations, the media server proxy parameters identify the media proxy media interface 313. In some implementations, the client proxy parameters identify the client proxy media interface 314.

In some implementations, the media server proxy parameters include at least media communication information of the media proxy media interface 313. In some implementations, media communication information of the media proxy media interface 313 includes at least one of a media communication IP address of the media proxy media interface 313, a media communication port of the media proxy media interface 313, a media communication protocol of the media proxy media interface 313, and a media processing codec of the media proxy media interface 313.

In some implementations, the client proxy parameters include at least media communication information of the client proxy media interface 314. In some implementations, media communication information of the client proxy media interface 314 includes at least one of a media communication IP address of the client proxy media interface 314, a media communication port of the client proxy media interface 314, a media communication protocol of the client proxy media interface 314, and a media processing codec of the client proxy media interface 314.

In some implementations, the media proxy service 310 provides the client proxy parameters and the media proxy parameters to the signaling controller 330 via at least one signaling message (e.g., the signaling message of the process S522). In some implementations, the media proxy service 310 provides the signaling message (e.g., the signaling message of the process S522) via the signaling interface 311, and the signaling controller 330 receives the signaling message via the signaling interface 331.

In some implementations, the signaling message of the process S522 is a SIP message. In some implementations, the signaling message of the process S522 is a SIP response (e.g., "200 OK") to the signaling message of the process S420 (shown in FIG. 5). In some implementations, the client proxy parameters and the media proxy parameters are included in the signaling message of the process S522 as SDP parameters.

In some implementations, the signaling controller 330 provides the client proxy parameters to the client system (e.g., 340) via a signaling message (e.g., the signaling message of the process S524), and the signaling controller 330 provides the media server proxy parameters to the media server (e.g., 321) via a signaling message (e.g., the signaling message of the process S523).

In some implementations, the signaling controller 330 provides the signaling message of the process S523 via the signaling interface 331, and the media server 321 receives the signaling message via the signaling interface 321*b*. In some implementations, the signaling message of the process S523 is a SIP message. In some implementations, the signaling message of the process S523 is a SIP response (e.g., "200 OK") to the signaling message of the process S511. In some implementations, the media server proxy parameters are included in the signaling message of the process S523 as SDP parameters.

In some implementations, the signaling controller 330 provides the signaling message of the process S524 via the signaling interface 331, and the client system 340 receives the signaling message via the signaling interface 342. In some implementations, the signaling message of the process S524 is a SIP message. In some implementations, the signaling message of the process S524 is a SIP response (e.g., "200 OK") to the first communication initiation 501. In some implementations, the client proxy parameters are included in the signaling message of the process S524 as SDP parameters.

4.3 Communicating Media by Using the Media Proxy Service

In some implementations, the process S430 functions to communicate media between the external client system (e.g., 340) and the invited media server (e.g., 321) by using the established media proxy (e.g., the media proxy 312 of the media proxy service 310) (e.g., the media proxy established at the process S521 of FIG. 5).

In some implementations, communicating media between the external client system (e.g., 340) and the invited media server (e.g., 321) by using the established media proxy (e.g., 312) includes controlling the media proxy service 310 to provide media received from the client system to the media server by using the media server media parameters (e.g., the media server media parameters of the process S511), and the client system provides the media to the media proxy service 310 by using the client proxy parameters (e.g., the client proxy parameters of the process S524).

In some implementations, communicating media between the external client system (e.g., 340) and the invited media server (e.g., 321) by using the established media proxy (e.g., 312) includes controlling the media proxy service 310 to provide media received from the media server to the client system by using the client media parameters (e.g., the client media parameters of the communication initiation 501), and the media server provides the media to the media proxy service 310 by using the media server proxy parameters (e.g., the media proxy parameters of the process S523).

In some implementations, the media proxy service 310 uses the media interface 313 to provide media received at the media interface 314 to the media server via the media interface 321*a*. In some implementations, the media proxy service 310 uses the media interface 314 to provide media received at the media interface 313 to the client system via the media interface 341.

4.4 Controlling Media Communication

In some implementations, the method 400 includes controlling media communication responsive to a signaling message provided by at least one of the client system (e.g., 340), the media server (e.g., 321) and the media proxy service 310. In some implementations, the signaling controller 330 receives the signaling message to control media communication (via the signaling interface 331). In some implementations, responsive to the signaling message to control media communication, the signaling controller 330 provides at least one signaling message to at least one of the client system (e.g., 340), the media server (e.g., 321) and the media proxy service 310.

In some implementations, controlling media communication includes at least one of ending media communication, recovering media communication, controlling operations performed on the media, controlling transcoding of the media, controlling a recording service, controlling a text-to-speech service, controlling a speech recognition service, controlling an input detection service, controlling a conferencing service, controlling a communicating application service (e.g., 350), and the like.

In some implementations, the method 400 includes ending media communication responsive to a signaling message (e.g., a SIP BYE message) provided by at least one of the client system (e.g., 340), the media server (e.g., 321) and the media proxy service 310. In some implementations, the signaling controller 330 receives the signaling message to end media communication (e.g., a SIP BYE message) (via the signaling interface 331). In some implementations, responsive to the signaling message to end media communication, the signaling controller 330 provides at least one signaling message to at least one of the client system (e.g., 340), the media server (e.g., 321) and the media proxy service 310.

5. Communication Application Service

In some implementations, the communication platform system 300 provides signaling and media communication to support a communication application session (e.g., of the communication application service 350), and the signaling controller 330 establishes a signaling channel with the communication application service 350 of the communication platform system 300. In some implementations, the signaling controller 330 establishes the signaling channel between the singling interface 331 of the signaling controller and the signaling interface 351 of the communication application service 350.

In some implementations, the communication application service 350 establishes a signaling channel and media communication with the provider gateway 360 of the communication platform system. In some implementations, the communication application service 350 establishes the signaling channel between the signaling interface 351 of the communication application service 350 and the provider gateway 360. In some implementations, the communication application service 350 establishes the media communication between the media interface 354 of the communication application service 350 and the provider gateway 360.

In some implementations, the communication application service 350 communicates media between the media interface 354 of the communication application service 350 and the media interface of a media server (e.g., the media interface 321c of the media server 321).

In some implementations, the communication application service 350 includes a call router (e.g., a call router as described above for FIG. 2).

6. Media Service Platform

In some implementations, the communication platform system is a media service platform (e.g., a platform that includes a media system similar to the media system 301), and the media services provided by the media service platform include at least one of transcoding services, conferencing services, DTMF tone interpretations, and scaling of picture in a video stream.

7. System Architecture: Communication Platform System

Figure 6:
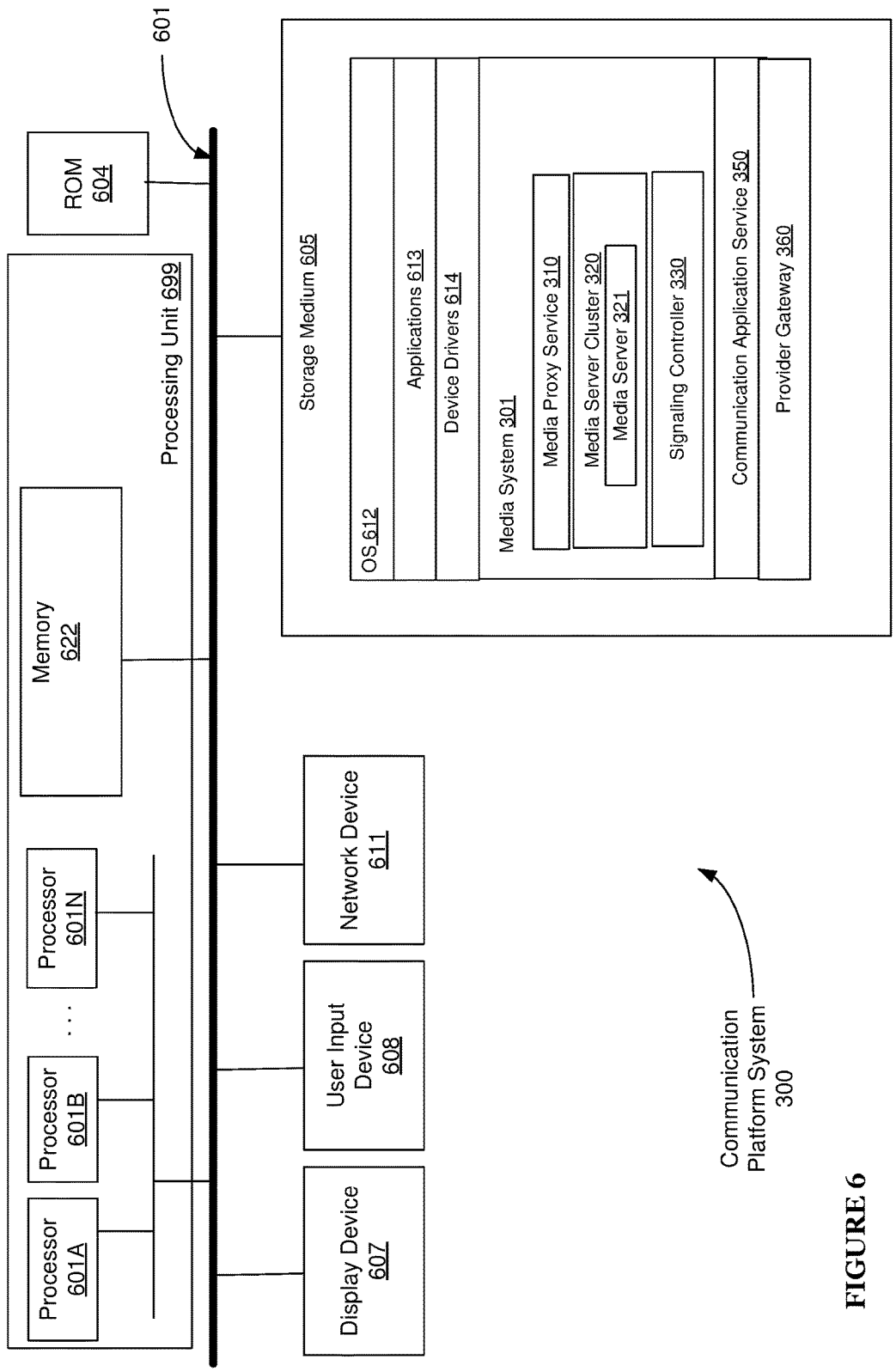
FIG. 6 is an architecture diagram of a system of a preferred embodiment.

FIG. 6 is an architecture diagram of a system (e.g., the communication platform system 300 of FIG. 3) according to an implementation in which the system is implemented by a server device. In some implementations, the system is implemented by a plurality of devices. In some implementations, the system 300 is similar to the system of FIG. 1.

The bus 601 interfaces with the processors 601A-601N, the main memory (e.g., a random access memory (RAM)) 622, a read only memory (ROM) 604, a processor-readable storage medium 605, a display device 607, a user input device 608, and a network device 611.

The processors 601A-601N may take many forms, such as ARM processors, X86 processors, and the like.

In some implementations, the system (e.g., 300) includes at least one of a central processing unit (processor) and a multi-processor unit (MPU).

The processors 601A-601N and the main memory 622 form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a media system, a communication application service, and a provider gateway.

The network adapter device 611 provides one or more wired or wireless interfaces for exchanging data and commands between the system (e.g., 300) and other devices, such as a client system 340 and a carrier network 370. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 622 (of the processing unit 699) from the processor-readable storage medium 605, the ROM 604 or any other storage location. During execution of these software programs, the respective machine-executable instructions are accessed by at least one of processors 601A-601N (of the processing unit 699) via the bus 601, and then executed by at least one of processors 601A-601N. Data used by the software programs are also stored in the memory 622, and such data is accessed by at least one of processors 601A-601N during execution of the machine-executable instructions of the software programs. The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 605 includes machine-executable instructions (and related data) for an operating system 612, software programs 613, device drivers 614, the media system 301, the communication application service 350, and the provider gateway 360. As shown in FIG. 6, the machine-executable instructions (and related data) for the media system 301 include machine-executable instructions (and related data) for the media proxy service 310, the media server cluster 320, the signaling controller 330, and the media server 321.

8. System Architecture: Media System

Figure 7:
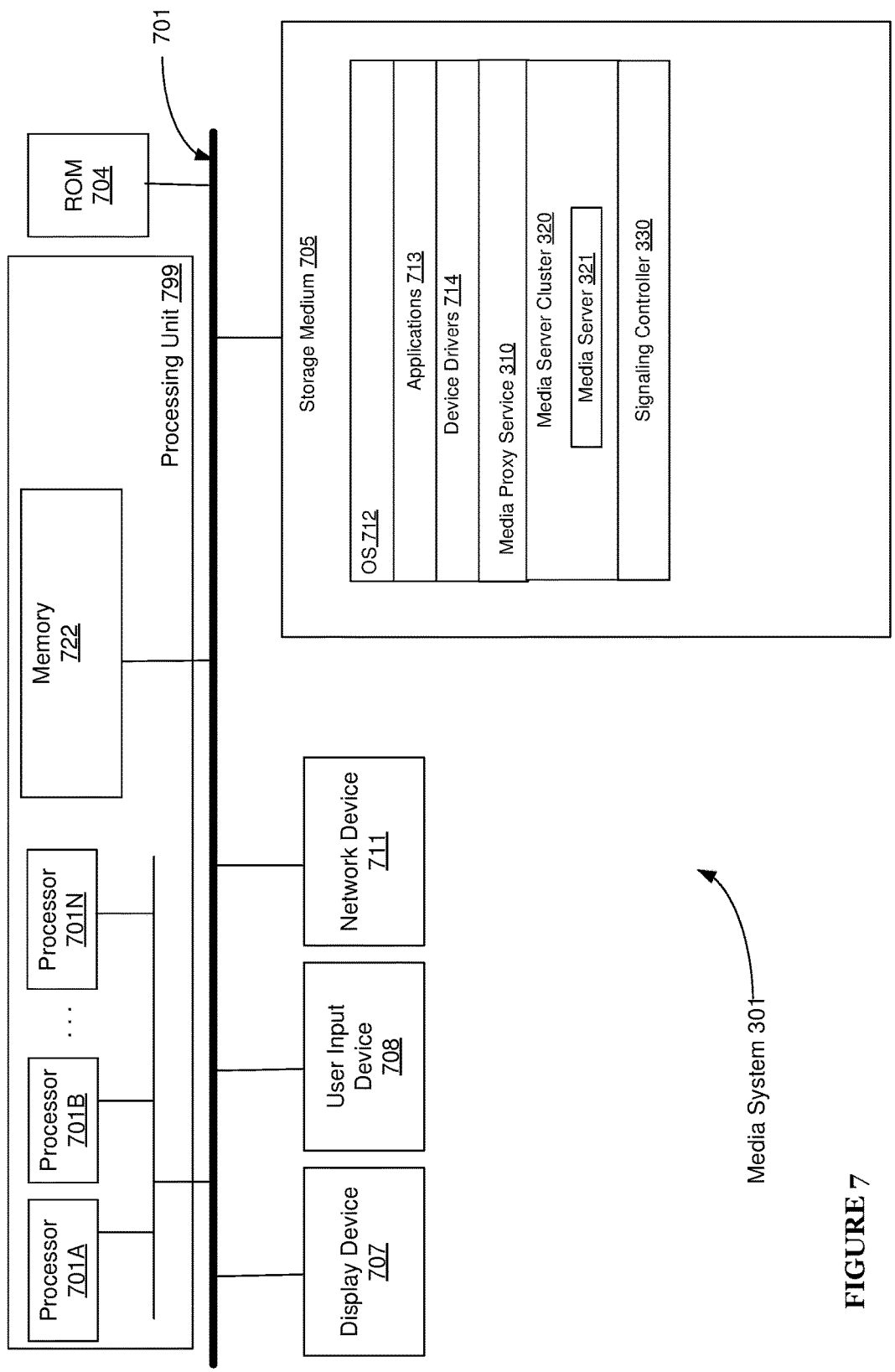
FIG. 7 is an architecture diagram of a system of a preferred embodiment.

FIG. 7 is an architecture diagram of a media system (e.g., the media system 301 of FIG. 3) according to an implementation in which the media system is implemented by a server device. In some implementations, the system is implemented by a plurality of devices.

The bus 701 interfaces with the processors 701A-701N, the main memory (e.g., a random access memory (RAM)) 722, a read only memory (ROM) 704, a processor-readable storage medium 705, a display device 707, a user input device 708, and a network device 711.

The processors 701A-701N may take many forms, such as ARM processors, X86 processors, and the like.

In some implementations, the media system (e.g., 301) includes at least one of a central processing unit (processor) and a multi-processor unit (MPU).

The processors 701A-701N and the main memory 722 form a processing unit 799. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a media proxy service, a media server cluster, a signaling controller, and a media server.

The network adapter device 711 provides one or more wired or wireless interfaces for exchanging data and commands between the media system (e.g., 301) and other devices, such as a client system (e.g., 340) and a communication application service (e.g., 350) of a communication platform system. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 722 (of the processing unit 799) from the processor-readable storage medium 705, the ROM 704 or any other storage location. During execution of these software programs, the respective machine-executable instructions are accessed by at least one of processors 701A-701N (of the processing unit 799) via the bus 704 and then executed by at least one of processors 701A-701N. Data used by the software programs are also stored in the memory 722, and such data is accessed by at least one of processors 701A-701N during execution of the machine-executable instructions of the software programs. The processor-readable storage medium 705 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 705 includes machine-executable instructions (and related data) for an operating system 712, software programs 713, device drivers 714, the media proxy service 310, the media server cluster 320, the signaling controller 330, and the media server 321.

9. Machines

The system and methods of the preferred embodiment and variations thereof can be embodied and/or implemented at least in part as a machine configured to receive a computer-readable medium storing computer-readable instructions. The instructions are preferably executed by computer-executable components preferably integrated with the media and signaling components of a communication platform or a media system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

10. Conclusion

As a person skilled in the art will recognize from the previous detailed description and from the figures and claims, modifications and changes can be made to the preferred embodiments of the invention without departing from the scope of this invention defined in the following claims.

The invention claimed is:

1. A method comprising:
receiving, by a signaling controller device, a first SIP (Session Initiation Protocol) INVITE request from a client system, wherein the first SIP INVITE request specifies a client codec of the client system;
selecting a first media server of a plurality of media servers and providing information specifying the client codec to the first media server;
receiving, from the first media server, information specifying a media server codec of the first media server, the first media server having transmitted the information specifying the media server codec in response to receiving the client codec from the signaling controller device;
providing information specifying the client codec and the media server codec to a proxy service;
receiving, from the proxy service, information specifying a client interface codec of the proxy service and a media server interface codec of the proxy service; and
providing information specifying the media server interface codec to the media server and providing information specifying the client interface codec to the client system, the proxy service communicating media between the client system and the media server via the client interface using one of the client codec and the client interface code, and the proxy service communicating media between proxy service and the media server via the media server interface using one of the media server codec and the media server interface codec.

2. The method of claim 1, further comprising:
communicating media between the client system and the media server.

3. The method of claim 2, wherein the client interface codec is a codec of a client interface of the proxy service.

4. The method of claim 2, wherein the media server interface codec is a codec of a media server interface of the proxy service.

5. The method of claim 1, wherein the client system is external to the signaling controller device.

6. The method of claim 1, wherein the plurality of media servers is external to the signaling controller device.

7. The method of claim 1, wherein the proxy service is external to the signaling controller device and the plurality of media servers.

8. The method of claim 1, further comprising:
authenticating the first SIP INVITE request, wherein selecting the media server is in response to authenticating the first SIP INVITE request.

9. The method of claim 1, wherein the first media server provides the information specifying the media server codec after receiving the information specifying the client codec from the signaling controller device.

10. The method of claim 1, wherein the proxy service provides the information specifying the client interface codex and the media server interface codec to the signaling controller device after receiving the information specifying the client codec and the media server codec from the signaling controller device.

11. A signaling controller device comprising:
one or more computer processors; and
one or more computer-readable mediums storing instructions that, when executed by the one or more computer processors, cause the signaling controller device to perform operations comprising:
receiving a first SIP (Session Initiation Protocol) INVITE request from a client system, wherein the first SIP INVITE request specifies a client codec of the client system;
selecting a first media server of a plurality of media servers and providing information specifying the client codec to the first media server;
receiving, from the first media server, information specifying a media server codec of the first media server, the first media server having transmitted the information specifying the media server codec in response to receiving the client codec from the signaling controller device;
providing information specifying the client codec and the media server codec to a proxy service;
receiving, from the proxy service, information specifying a client interface codec of the proxy service and a media server interface codec of the proxy service; and
providing information specifying the media server interface codec to the media server and providing information specifying the client interface codec to the client system, the proxy service communicating media between the client system and the media server via the client interface using one of the client codec and the client interface code, and the proxy service communicating media between proxy service and the media server via the media server interface using one of the media server codec and the media server interface codec.

12. The signaling controller device of claim 11, the operations further comprising:
communicating media between the client system and the media server.

13. The signaling controller device of claim 12, wherein the client interface codec is a codec of a client interface of the proxy service.

14. The signaling controller device of claim 12, wherein the media server interface codec is a codec of a media server interface of the proxy service.

15. The signaling controller device of claim 11, wherein the client system is external to the signaling controller device.

16. A non-transitory computer-readable medium storing instructions that, when executed by one or more computer processors of a signaling controller device, cause the signaling controller device to perform operations comprising:
receiving a first SIP (Session Initiation Protocol) INVITE request from a client system, wherein the first SIP INVITE request specifies a client codec of the client system;
selecting a first media server of a plurality of media servers and providing information specifying the client codec to the first media server;
receiving, from the first media server, information specifying a media server codec of the first media server, the first media server having transmitted the information specifying the media server codec in response to receiving the client codec from the signaling controller device;
providing information specifying the client codec and the media server codec to a proxy service;
receiving, from the proxy service, information specifying a client interface codec of the proxy service and a media server interface codec of the proxy service; and
providing information specifying the media server interface codec to the media server and providing information specifying the client interface codec to the client system, the proxy service communicating media between the client system and the media server via the client interface using one of the client codec and the client interface code, and the proxy service communicating media between proxy service and the media server via the media server interface using one of the media server codec and the media server interface codec.

17. The non-transitory computer-readable medium of claim 16, the operations further comprising:
communicating media between the client system and the media server.

18. The non-transitory computer-readable medium of claim 17, wherein the client interface codec is a codec of a client interface of the proxy service.

19. The non-transitory computer-readable medium of claim 17, wherein the media server interface codec is a codec of a media server interface of the proxy service.

20. The non-transitory computer-readable medium of claim 16, wherein the client system is external to the signaling controller device.

* * * * *

UNITED STATES PATENT AND TRADEMARK OFFICE
CERTIFICATE OF CORRECTION

PATENT NO. : 10,212,237 B2
APPLICATION NO. : 15/687054
DATED : February 19, 2019
INVENTOR(S) : Brian Tarricone Page 1 of 1

It is certified that error appears in the above-identified patent and that said Letters Patent is hereby corrected as shown below:

In the Claims

In Column 21, Line 7, in Claim 10, delete "codex" and insert --codec-- therefor

Signed and Sealed this
Fifth Day of May, 2020

Andrei Iancu
*Director of the United States Patent and Trademark Office*